(12) United States Patent
Feldman et al.

(10) Patent No.: US 9,155,060 B2
(45) Date of Patent: Oct. 6, 2015

(54) SYSTEM AND METHOD FOR GEOGRAPHICALLY LOCATING A CELLULAR PHONE

(75) Inventors: Israel Feldman, Herzliya (IL); Yochay Meltzer, Givatayim (IL); Uri Lavee, Tel-Aviv (IL); Allon Eshpar, Kefar-Sava (IL)

(73) Assignee: INRX GLOBAL SERVICES LIMITED (GB)

( * ) Notice: Subject to any disclaimer, the term of this patent is extended or adjusted under 35 U.S.C. 154(b) by 0 days.

(21) Appl. No.: 13/020,427

(22) Filed: Feb. 3, 2011

(65) Prior Publication Data

US 2011/0159875 A1 Jun. 30, 2011

Related U.S. Application Data

(60) Division of application No. 12/614,538, filed on Nov. 9, 2009, which is a continuation of application No. 10/888,631, filed on Jul. 9, 2004, now Pat. No. 7,620,402.

(51) Int. Cl.
  *H04W 36/32* (2009.01)
  *H04W 64/00* (2009.01)
  *H04W 36/14* (2009.01)

(52) U.S. Cl.
  CPC ............ *H04W 64/00* (2013.01); *H04W 36/14* (2013.01); *H04W 36/32* (2013.01)

(58) Field of Classification Search
  CPC ..... H04W 36/32; H04W 64/00; H04W 36/08; H04W 36/14
  USPC .......................... 455/440, 421, 446, 424, 442
  See application file for complete search history.

(56) References Cited

U.S. PATENT DOCUMENTS

| | | |
|---|---|---|
| 4,361,202 A | 11/1982 | Minovitch |
| 4,985,705 A | 1/1991 | Stammler |
| 5,122,959 A | 6/1992 | Nathanson et al. |
| 5,131,020 A | 7/1992 | Liebesny et al. |

(Continued)

FOREIGN PATENT DOCUMENTS

| | | |
|---|---|---|
| CA | 2 434 707 A1 | 3/2004 |
| DE | 33 46 548 A1 | 7/1985 |

(Continued)

OTHER PUBLICATIONS

United States Office Action, issued in U.S. Appl. No. 12/614,538, dated Feb. 3, 2011.

(Continued)

*Primary Examiner* — Michael T Vu
(74) *Attorney, Agent, or Firm* — Burns & Levinson LLP; Joseph M. Maraia

(57) ABSTRACT

According to an embodiment of the invention, there is disclosed a method for geographically locating a cellular phone. The method comprises: determining an effective cell-area for each of a first cell and a second cell in a cellular network; and determining a handover area within which the cellular phone is likely to be located when control of the cellular phone is transferred from the first cell to the second cell; wherein the determination of the handover area and the effective cell-area for each of the first cell and the second cell are made based on a topological relationship between the first cell and the second cell. Further related apparatus embodiments are also disclosed.

20 Claims, 13 Drawing Sheets

(56) References Cited

U.S. PATENT DOCUMENTS

| | | | |
|---|---|---|---|
| 5,182,555 A | 1/1993 | Sumner | |
| 5,187,810 A | 2/1993 | Yoneyama et al. | |
| 5,272,638 A | 12/1993 | Martin et al. | |
| 5,327,144 A | 7/1994 | Stilp et al. | |
| 5,343,906 A | 9/1994 | Tibbals, III | |
| 5,428,545 A | 6/1995 | Maegawa et al. | |
| 5,432,842 A | 7/1995 | Kinoshita et al. | |
| 5,438,517 A | 8/1995 | Sennott | |
| 5,465,088 A | 11/1995 | Braegas | |
| 5,465,289 A | 11/1995 | Kennedy, Jr. | |
| 5,523,950 A | 6/1996 | Peterson | |
| 5,539,645 A | 7/1996 | Mandhyan et al. | |
| 5,543,789 A | 8/1996 | Behr et al. | |
| 5,543,802 A | 8/1996 | Villevieille et al. | |
| 5,559,864 A | 9/1996 | Kennedy, Jr. | |
| 5,613,205 A | 3/1997 | Dufour | |
| 5,689,252 A | 11/1997 | Ayanoglu et al. | |
| 5,724,243 A | 3/1998 | Westerlage | |
| 5,732,383 A | 3/1998 | Foladare et al. | |
| 5,740,166 A | 4/1998 | Ekemark et al. | |
| 5,745,865 A | 4/1998 | Rostoker et al. | |
| 5,751,245 A | 5/1998 | Janky et al. | |
| 5,774,827 A | 6/1998 | Smith et al. | |
| 5,801,943 A | 9/1998 | Nasburg | |
| 5,839,086 A | 11/1998 | Hirano | |
| 5,845,227 A | 12/1998 | Peterson | |
| 5,880,958 A | 3/1999 | Helms et al. | |
| 5,933,100 A | 8/1999 | Golding | |
| 5,948,042 A | 9/1999 | Heimann et al. | |
| 5,959,568 A | 9/1999 | Woolley | |
| 6,012,012 A | 1/2000 | Fleck et al. | |
| 6,038,444 A * | 3/2000 | Schipper et al. | 455/421 |
| 6,098,016 A | 8/2000 | Ishihara | |
| 6,128,571 A | 10/2000 | Ito et al. | |
| 6,161,071 A | 12/2000 | Shuman et al. | |
| 6,178,374 B1 | 1/2001 | Mohlenkamp et al. | |
| 6,219,793 B1 | 4/2001 | Li et al. | |
| 6,230,011 B1 | 5/2001 | Guenther et al. | |
| 6,236,932 B1 | 5/2001 | Fastenrath | |
| 6,236,933 B1 | 5/2001 | Lang | |
| 6,240,364 B1 | 5/2001 | Kerner et al. | |
| 6,256,577 B1 | 7/2001 | Graunke | |
| 6,263,205 B1 * | 7/2001 | Yamaura et al. | 455/442 |
| 6,288,676 B1 | 9/2001 | Maloney | |
| 6,314,360 B1 | 11/2001 | Becker | |
| 6,317,686 B1 | 11/2001 | Ran | |
| 6,341,255 B1 | 1/2002 | Lapidot | |
| 6,401,027 B1 | 6/2002 | Xu et al. | |
| 6,401,037 B1 | 6/2002 | Muller et al. | |
| 6,411,897 B1 | 6/2002 | Gaspard, II | |
| 6,424,838 B1 | 7/2002 | Stobbe et al. | |
| 6,430,496 B1 | 8/2002 | Smith et al. | |
| 6,438,561 B1 | 8/2002 | Israni et al. | |
| 6,466,862 B1 | 10/2002 | DeKock et al. | |
| 6,480,783 B1 | 11/2002 | Myr | |
| 6,490,519 B1 | 12/2002 | Lapidot et al. | |
| 6,532,414 B2 | 3/2003 | Mintz | |
| 6,545,637 B1 | 4/2003 | Krull et al. | |
| 6,587,781 B2 | 7/2003 | Feldman et al. | |
| 6,594,577 B2 | 7/2003 | Nakajima et al. | |
| 6,606,494 B1 | 8/2003 | Arpee et al. | |
| 6,618,650 B1 | 9/2003 | Nakai et al. | |
| 6,708,036 B2 * | 3/2004 | Proctor et al. | 455/446 |
| 6,711,404 B1 | 3/2004 | Arpee et al. | |
| 6,718,425 B1 | 4/2004 | Pajakowski et al. | |
| 6,792,263 B1 | 9/2004 | Kite | |
| 6,799,046 B1 | 9/2004 | Tang | |
| 6,842,620 B2 | 1/2005 | Smith et al. | |
| 6,911,918 B2 | 6/2005 | Chen | |
| 6,922,629 B2 | 7/2005 | Yoshikawa et al. | |
| 6,947,833 B2 | 9/2005 | Kita et al. | |
| 6,952,643 B2 | 10/2005 | Matsuoka et al. | |
| 6,989,765 B2 | 1/2006 | Gueziec | |
| 7,031,983 B2 | 4/2006 | Israni et al. | |
| 7,062,379 B2 | 6/2006 | Videtich | |
| 7,107,038 B2 | 9/2006 | Fitch et al. | |
| 7,155,376 B2 | 12/2006 | Yang et al. | |
| 7,274,941 B2 * | 9/2007 | Cole et al. | 455/456.1 |
| 7,620,402 B2 | 11/2009 | Feldman et al. | |
| 7,986,954 B1 | 7/2011 | Steer | |
| 2001/0018628 A1 | 8/2001 | Jenkins et al. | |
| 2001/0029425 A1 | 10/2001 | Myr | |
| 2001/0034577 A1 | 10/2001 | Grounds et al. | |
| 2001/0037174 A1 | 11/2001 | Dickerson | |
| 2002/0009184 A1 | 1/2002 | Shnier | |
| 2002/0026278 A1 | 2/2002 | Feldman et al. | |
| 2002/0030698 A1 | 3/2002 | Baur et al. | |
| 2002/0049630 A1 | 4/2002 | Furuta et al. | |
| 2002/0055818 A1 | 5/2002 | Gaspard | |
| 2002/0090951 A1 * | 7/2002 | Kanagawa | 455/446 |
| 2002/0120390 A1 | 8/2002 | Bullock | |
| 2002/0198694 A1 | 12/2002 | Yang et al. | |
| 2003/0003918 A1 | 1/2003 | Proctor et al. | |
| 2003/0040944 A1 | 2/2003 | Hileman | |
| 2003/0069683 A1 | 4/2003 | Lapidot et al. | |
| 2003/0096620 A1 | 5/2003 | Ozturk et al. | |
| 2003/0135304 A1 | 7/2003 | Sroub et al. | |
| 2003/0219024 A1 | 11/2003 | Purnadi et al. | |
| 2003/0236818 A1 | 12/2003 | Bruner et al. | |
| 2004/0076279 A1 | 4/2004 | Taschereau | |
| 2004/0082312 A1 | 4/2004 | O'Neill et al. | |
| 2004/0111214 A1 | 6/2004 | Buecher et al. | |
| 2004/0243285 A1 | 12/2004 | Gounder | |
| 2005/0026619 A1 | 2/2005 | Jha | |
| 2005/0065682 A1 | 3/2005 | Kapadia et al. | |
| 2005/0192031 A1 | 9/2005 | Vare | |
| 2006/0009885 A1 | 1/2006 | Raines et al. | |
| 2006/0025158 A1 | 2/2006 | Leblanc et al. | |
| 2007/0060108 A1 | 3/2007 | East et al. | |
| 2007/0106465 A1 | 5/2007 | Adam et al. | |
| 2008/0214192 A1 * | 9/2008 | Soliman | 455/436 |
| 2009/0036148 A1 | 2/2009 | Yach | |
| 2010/0010739 A1 | 1/2010 | Tsushima | |

FOREIGN PATENT DOCUMENTS

| | | |
|---|---|---|
| DE | 40 05 803 A1 | 8/1990 |
| DE | 42 41 408 A1 | 6/1994 |
| DE | 195 25 291 C1 | 12/1996 |
| DE | 196 38 798 A1 | 3/1998 |
| DE | 196 51 146 A1 | 6/1998 |
| DE | 197 55 875 A1 | 6/1998 |
| DE | 199 17 154 A1 | 10/2000 |
| DE | 199 33 639 A1 | 1/2001 |
| DE | 199 48 416 A1 | 4/2001 |
| DE | 100 63 588 A1 | 7/2001 |
| DE | 100 37 827 A1 | 2/2002 |
| EP | 0 365 097 A1 | 4/1990 |
| EP | 0 372 840 A2 | 6/1990 |
| EP | 0 715 285 A1 | 6/1996 |
| EP | 0 715 286 A1 | 6/1996 |
| EP | 0 715 288 A1 | 6/1996 |
| EP | 0 715 291 A1 | 6/1996 |
| EP | 0 763 807 A1 | 3/1997 |
| EP | 0 834 840 A1 | 4/1998 |
| EP | 0 838 663 A2 | 4/1998 |
| EP | 0 838 797 A1 | 4/1998 |
| EP | 0879460 A1 | 11/1998 |
| EP | 0 921 509 A2 | 6/1999 |
| EP | 0 936 590 A2 | 8/1999 |
| EP | 0951187 A1 | 10/1999 |
| EP | 1 162 560 A2 | 12/2001 |
| EP | 1 320 075 A2 | 6/2003 |
| EP | 1 387 333 A1 | 2/2004 |
| EP | 1 515 122 A1 | 3/2005 |
| JP | 1-137778 | 5/1989 |
| JP | 4-290098 | 10/1992 |
| JP | 5-46086 | 2/1993 |
| JP | 5-233996 | 9/1993 |
| JP | 6-12593 | 1/1994 |
| JP | 7-83685 | 3/1995 |
| JP | 8-129697 | 5/1996 |
| JP | 9-14986 | 1/1997 |
| JP | H09113290 A | 5/1997 |

(56) References Cited

FOREIGN PATENT DOCUMENTS

| | | |
|---|---|---|
| JP | H10300495 A | 11/1998 |
| JP | 11-25389 | 1/1999 |
| JP | 2001-124569 | 5/2001 |
| JP | 2002122437 A | 4/2002 |
| JP | 2002-206395 | 7/2002 |
| WO | WO 94/11839 | 5/1994 |
| WO | 9502307 A1 | 1/1995 |
| WO | WO 95/14292 | 5/1995 |
| WO | WO 96/10807 | 4/1996 |
| WO | WO 96/25830 | 8/1996 |
| WO | WO 96/29688 | 9/1996 |
| WO | 9642179 A1 | 12/1996 |
| WO | WO 97/29470 | 8/1997 |
| WO | WO 97/29471 | 8/1997 |
| WO | WO 97/31241 | 8/1997 |
| WO | 9737318 A1 | 10/1997 |
| WO | WO 97/36148 | 10/1997 |
| WO | WO 97/40606 | 10/1997 |
| WO | WO 98/15149 | 4/1998 |
| WO | WO 98/15935 | 4/1998 |
| WO | WO 98/23115 | 5/1998 |
| WO | WO 98/26395 | 6/1998 |
| WO | WO 98/29758 | 7/1998 |
| WO | WO 98/36397 | 8/1998 |
| WO | WO 98/42179 | 10/1998 |
| WO | WO 98/54682 | 12/1998 |
| WO | WO 99/63499 | 12/1999 |
| WO | WO 01/01367 A1 | 1/2001 |
| WO | WO 01/23835 A2 | 4/2001 |
| WO | WO 01/35370 A1 | 5/2001 |
| WO | WO 01/48725 A1 | 7/2001 |
| WO | WO 02/01158 A1 | 1/2002 |
| WO | WO 02/01532 A1 | 1/2002 |
| WO | WO 02/03350 A1 | 1/2002 |
| WO | WO 02/43026 A1 | 5/2002 |
| WO | WO 03/041030 A2 | 5/2003 |
| WO | WO 03/073048 A2 | 9/2003 |
| WO | 2004021305 A2 | 3/2004 |
| WO | WO 2004/086799 A1 | 10/2004 |
| WO | WO 2008/114369 A1 | 9/2008 |

OTHER PUBLICATIONS

United States Office Action, issued in U.S. Appl. No. 13/070,982, dated Sep. 15, 2011.
R. Sankar et al., "Intelligent Traffic Monitoring System Using Wireless Cellular Communications," © 1997 IEEE.
K. Abe et al., "A Planning Method Combining Rule-Bases and Optimization Algorithms for Transportation Network," © 1992.
"Data Fusion for Dynamic Route Guidance Systems," International Federation of Automatic Control (IFAC), 2361 Laxenburg, Schlossplatz 12, 1997.
N. Shamanesh, "Getting Drivers Out of a Jam," Automotive Engineer, Oct. 1999.
Wang et al., "An Unified Vehicle Supervising and Traffic Information System," © 1996 IEEE.
Fastenrath, Floating Car Data on a Larger Scale, Oct. 24, 1997.
J.J. Caffery et al., "Overview of Radiolocation in CDMA Cellular Systems," published 1998; See Chapter "Accuracy Requirement" pp. 7-8; <http://sss-mag.com/pdf/radioloc.pdf>.
International Search Report issued in International Patent Application No. PCT/GB2005/002637 dated Sep. 21, 2005.
Written Opinion of the International Searching Authority issued in International Patent Application No. PCT/GB2005/002637 dated Sep. 21, 2005.
M. Westerman et al., "Integration of Probe Vehicle and Induction Loop Data—Estimation of Travel Times and Automatic Incident Detection," California PATH Research Report, Institute of Transportation Studies, Jan. 1, 1996.
"Grubbs Test for Outliers," Engineering Statistics Handbook, 2000.
United States Office Action issued in U.S. Appl. No. 13/070,982 dated May 1, 2012.
Final Office Action mailed Sep. 14, 2012 issued from the U.S. Patent Office in corresponding U.S. Appl. No. 13/070,982.
United States Office Action issued in U.S. Appl. No. 13/070,982 dated Sep. 24, 2013.
U.S. Office Action issued in U.S. Appl. No. 12/614,538, dated Dec. 19, 2011.

* cited by examiner

SYSTEM AND METHOD FOR GEOGRAPHICALLY LOCATING A CELLULAR PHONE

RELATED APPLICATIONS

This application is a divisional of U.S. application Ser. No. 12/614,538 filed on Nov. 9, 2009, which is a continuation of U.S. application Ser. No. 10/888,631 filed 9 Jul. 2004, now U.S. Pat. No. 7,620,402, the entire contents of each of which are incorporated herein by reference.

TECHNICAL FIELD

This invention relates to systems and methods for geographically locating a cellular phone; and in particular to the use of such systems and methods for locating vehicles in a traffic information system

BACKGROUND

Determining the geographical location of a cellular phone is useful in a variety of applications, including applications in the field of location-based services. In traffic information systems, for example, the locations of vehicles may be determined based on the locations of drivers' cellular phones, in order to form an image of traffic conditions. The location of a cellular phone can be determined based on data acquired from the cellular network itself. In particular, the location can be specified in terms of the network cell in which the cellular phone is located, as defined by a cell-identifier, possibly in addition to other data such as a time-advance.

There is an ongoing need, however, for accurate techniques of determining the geographical location of cellular phones, in many applications.

SUMMARY

According to an aspect of the present invention there is provided a method for geographically locating a cellular phone, the method comprising determining an effective cell area for each of a first cell and a second cell in a cellular network and determining a handover area within which the cellular phone is likely to be located when control of the cellular phone is transferred from the first cell to the second cell. The determination of the handover area and the effective cell-area for each of the first cell and the second cell are made based on a topological relationship between the first cell and the second cell.

According to another aspect of the present invention, there is provided a method for geographically locating a cellular phone in a cellular network comprising a first antenna for a first cell and a second antenna for a second cell, the method comprising (i) determining an effective radius $R_i$ for each of a set of i different topological relationships between the first cell and the second cell, (ii) determining an angle $\alpha$ for which, when the first antenna is contained within the second cell, and when an angle $\beta$ formed by a line between the first antenna and the second antenna and a sector limit line of the second cell is less than the angle $\alpha$; the second cell will be extended beyond the sector limit line, (iii) determining a first extension width $E_1$ of a first rectangular extension added to a sector limit line of the second cell when the angle $\beta$ is less than the angle $\alpha$; (iv) determining a second extension width $E_2$ of a second rectangular extension added to a sector limit line of the second cell when the first antenna is outside the second cell, and when an inner angle formed between a sector limit line of the second cell and a line between the first antenna and the second antenna, is greater than 180 degrees, (v) determining a first penumbra width $W_1$ of a first rectangular strip between a line of equal intensity of signal reception from the first antenna and the second antenna, and a first strip limit proximal to a cell into which the cellular phone is moving, (vi) determining a second penumbra width $W_2$ of a second rectangular strip between the line of equal intensity and a second strip limit proximal to a cell out of which the cellular phone is moving, and (vii) determining a handover area within which the cellular phone is likely to be located when control of the cellular phone is transferred from the first cell to the second cell, the determination of the handover area being based on at least a subset of the effective radii $R_i$, the angle $\alpha$; the first extension width $E_1$, the second extension width $E_2$, the first penumbra width $W_1$, and the second penumbra width $W_2$.

According to another aspect of the present invention, there is provided a method of geographically locating a cellular phone by determining the area in which handover from a first cell to a second cell occurs, the method comprising modeling at least a portion of a cell reception area of said first cell and said second cell and defining a handover area comprising overlapping portions of said first and second cell areas.

According to another aspect of the present invention, there is provided a method of monitoring traffic flow by determining successive locations of a plurality of cellular phones located in a plurality of vehicles, the method comprising repeat determination of the location of at least some of the plurality of cellular phones. This determination is preferably by means of sampling the locations of the at least some of the cellular phones to determine a present picture of traffic flow. The step of determining the location of a cellular phone of the plurality comprises determining the area in which handover from a first cell to a second cell occurs, the handover determination being based on modeling at least a portion of a cell reception area of said first cell and said second cell and defining the handover area to comprise overlapping portions of said first and second cell areas.

According to another aspect of the present invention, there is provided apparatus for geographically locating a cellular phone, the apparatus comprising an effective cell-area module for determining an effective cell-area for each of a first cell and a second cell in a cellular network and a handover area module for determining a handover area within which the cellular phone is likely to be located when control of the cellular phone is transferred from the first cell to the second cell. The determination of the handover area and the effective cell-area for each of the first cell and the second cell are made based on a topological relationship between the first cell and the second cell.

According to another aspect of the present invention, there is provided apparatus for geographically locating a cellular phone by determining the area in which handover from a first cell to a second cell occurs, the apparatus comprising an effective cell-area module for modeling at least a portion of a cell reception area of said first cell and said second cell, and a handover area module for defining a handover area comprising overlapping portions of said first and second cell areas.

According to another aspect of the present invention, there is provided apparatus for monitoring traffic flow by determining successive locations of a plurality of cellular phones located in a plurality of vehicles. The apparatus comprises (i) a handover area module for defining a handover area comprising overlapping portions of a modeled cell reception area of at least a portion of each of a first cell and a second cell of a cellular network, and (ii) a sampler module for sampling a set of repeated location determinations of at least some of the plurality of cellular phones, to determine a present picture of traffic flow, wherein each such location determination is based at least in part on the handover area defined by the handover area module for a given cellular phone moving between a given first cell and second cell of the cellular network.

Additional advantages and novel features of the invention will be set forth in part in the description which follows, and in part will become apparent to those skilled in the art upon examination of the following and the accompanying drawings; or may be learned by practice of the invention.

BRIEF DESCRIPTION OF THE DRAWINGS

For a better understanding of the present invention, and to show how the same may be carried into effect, reference will now be made, by way of example only, to the accompanying drawings, in which.

DETAILED DESCRIPTION

Although techniques are known for determining the location of a cellular phone based on the network cell in which the phone is located, the accuracy of such techniques is limited by the large geographical area covered by each cell. Other techniques are known in which a specific machine is used to actively monitor the location of given handsets by request. However, such techniques load the network, and are therefore costly and limited in capacity.

Cellular networks operate using a network of antennas, each of which communicates messages to and from cellular phones located in a given area, called a cell. Cell areas from different antennas overlap, so that the domain of operation of the cellular network is completely covered. At any given time, a cellular phone is under the control of a single cell of the network. The controlling cell is usually the one whose reception intensity is the strongest at the location of the cellular phone. When a cellular phone is in motion, it traverses from cell to cell, and its control is "handed over" from one cell to another. The event of control transfer from cell to cell is called "handover."

Theoretically, a handover event from cell A to cell B occurs when a cellular phone moves from an area where the intensity of the signal from the cell A antenna is higher than that of the cell B antenna, to an area where the intensity of the signal from the cell B antenna is higher than that of the cell A antenna. Thus, the handover event should theoretically occur when the cellular phone crosses a line of equal-intensity signals from both cells. However, in reality, the handover does not occur exactly on the equal-intensity line, but rather within a certain penumbra area around the equal-intensity line. The form and dimension of the penumbra area depends on various parameters, including the relative positioning of the cells involved, which is determined by the location and orientation of the antennas.

In an embodiment according to the invention, there is disclosed a technique for geographically locating a cellular phone with high confidence at the moment that handover occurs, by determining the "handover area," which is the area in which handover from cell A to cell B might occur at high probability. Because the handover areas are found to be smaller than cell areas, on average, this technique offers better accuracy than techniques that use only the cell area to locate a phone. Additionally, handover events are recorded by the cellular network management system, and are therefore available at no additional cost, so that the technique is relatively inexpensive.

In order to implement an embodiment according to the invention, a polygon must be constructed to represent the handover area. In order to do so, four simplifying assumptions are made.

Figure 1:
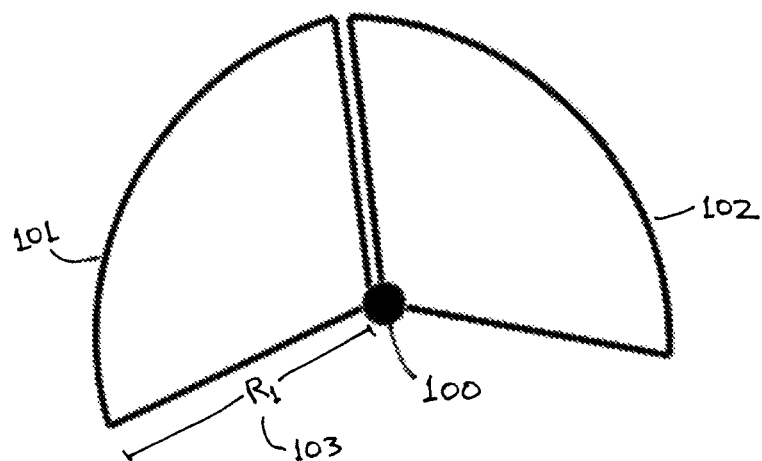
FIG. 1 shows first and second cells of a cellular network having antennas located at the same point, in accordance with an embodiment of the invention.

First, the simplifying assumption is made that the control area of an antenna (a cell area) is a sector, generally of 120 degrees, whose center is the antenna; see, for example, sector 101, centered around antenna 100 of the embodiment of FIG. 1.

Second, the simplifying assumption is made that the reception intensity of signals from the antenna grows in inverse relation to the distance from the antenna, while the cellular phone is located within the sector. Other factors that influence the reception intensity of signals from the antenna are ignored, such as the exact azimuth of the antenna, the effect of reflections, and the effect of multi-pathing; because the influence of such factors is limited, and the factors often statistically offset one another.

Third, the simplifying assumption is made that the reception intensity from the antenna outside the sector is significantly lower than the reception intensity within the sector.

Fourth, the simplifying assumption is made that the handover from one cell to another occurs within a reasonable distance from a point where the cellular phone receives a signal from both antennas at equal intensity.

Based on these assumptions, an embodiment according to the invention initially models a cell's reception area as a sector with a final radius. Beyond that radius, reception does occur, but it is significantly weaker than reception within the radius. Also, there are regions of weak reception beyond the limiting lines of the sector; and in the area behind the antenna, in the opposite direction from the sector. In some cases, control over a cellular phone can be handed over within these weak reception areas. An embodiment according to the invention therefore extends the cell reception area, initially modeled as a sector, into these weak reception areas, in certain circumstances. Once the effect of such circumstances has been considered, and the cell sector area possibly extended (or not), the resulting model of the cell's reception is here termed the effective cell area. As will be seen further below, whether to extend a cell sector area can be determined based on the relative positions and orientations of the two antennas between which a phone is moving. For example, extensions can be made when one cell's antenna is situated within the other cell's sector, but very close to the sector's limit (as in the embodiment of FIG. 5); or when one cell's antenna is situated outside the other cell's sector in specific configurations (as in the embodiment of FIG. 6). In these cases, the effective cell area includes extensions beyond the sector limits. Also, the radius of the sector can be extended or diminished, in some cases, based on the distance between the antennas of the two cells; the resulting radius is here termed the effective radius of the cell.

By taking such effects into consideration, an embodiment according to the invention constructs a polygon representing the handover area out of a combination of two areas: 1) the overlap part of the effective cell-areas of the two cells between which the cellular phone is moving; and 2) the penumbra area around the equal-intensity line between the antennas of the two cells. As will be seen below, the relative positioning of the two cells plays a significant role in the determination of these two areas; and there are cases in which the penumbra area is impossible to define, and therefore only the effective cell area is used.

Figure 2:
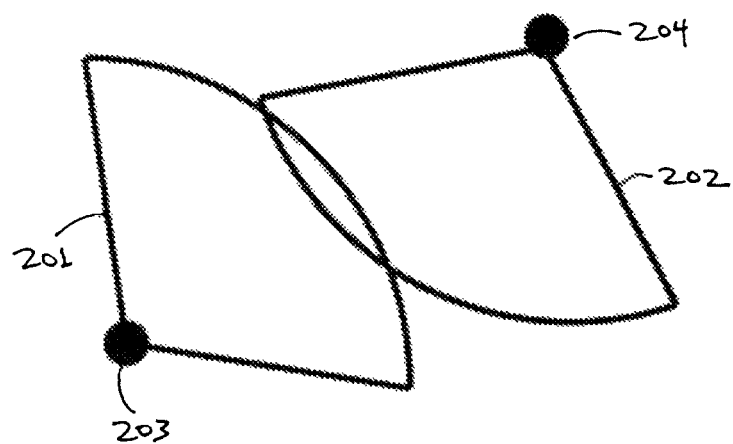
FIG. 2 shows first and second cells of a cellular network, the cells having antennas located at different points, and oriented to face each other, in accordance with an embodiment of the invention.
Figure 3:
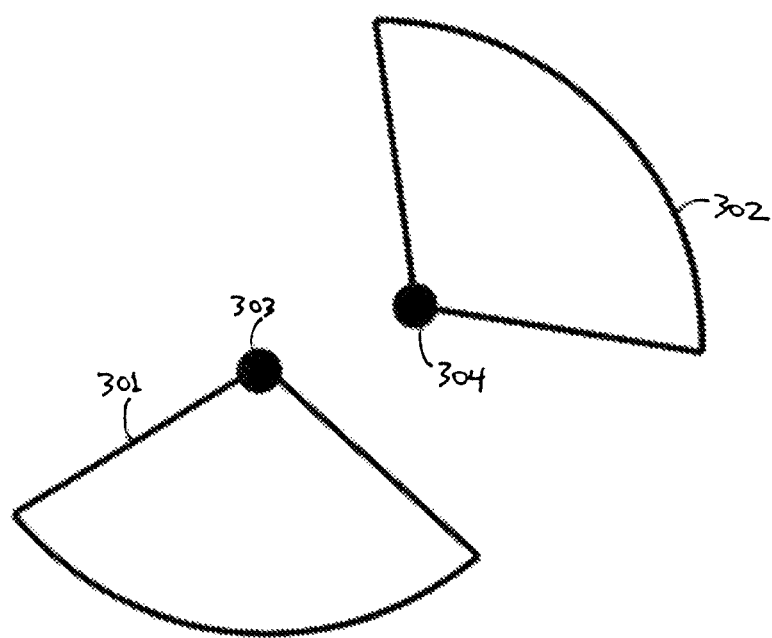
FIG. 3 shows first and second cells of a cellular network, the cells having antennas located at different points, and having sectors that do not overlap, in accordance with an embodiment of the invention.
Figure 4:
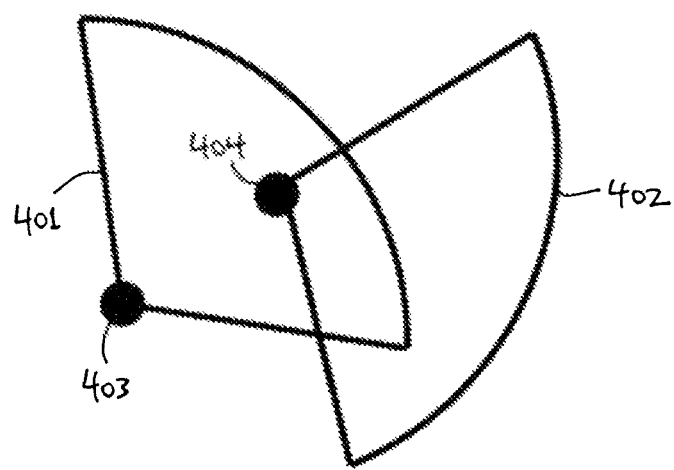
FIG. 4 shows first and second cells of a cellular network, the cells having antennas located at different points, which face at an acute angle to each other, and whose sectors overlap, in accordance with an embodiment of the invention.

FIGS. 1 through 4 illustrate four possible topological relative positions of two cells, in accordance with an embodiment of the invention. In FIG. 1, a first cell 101 and a second cell 102 have antennas located at the same point 100. In FIG. 2, a first cell 201 produced by a first antenna 203 is oriented to face a second cell 202, produced by a second antenna 204; the two cells have antennas located at different points, and are facing each other. In FIG. 3, a first cell 301 and a second cell 302 have antennas 303 and 304 located at different points, and their sectors do not overlap. FIG. 4 shows an example which does not fit into the topological categories of FIGS. 1 through 3, thereby representing all other topological cases; in this case, antennas 403 and 404 are located at different sites, are facing at an acute angle to each other, and the sectors 401 and 402 overlap.

In an embodiment according to the invention, a method for geographically locating a cellular phone includes three steps: first, determining the effective cell-area of each cell; second, determining the penumbra area around the equal-intensity line; and third, combining the areas determined in the first and second steps to determine the handover area.

A first step of an embodiment according to the invention comprises determining the effective cell-area of each cell. In order to do so, there is first determined an effective radius of the cell-sector. The existence of such a radius is premised on the second simplifying assumption above, i.e. that the reception intensity of the antenna within the sector grows in inverse relation to the distance from the antenna. Determining the effective radius depends on the topological case involved: in the topology of the embodiment of FIG. 1, in which the antennas are located at the same site 100, the effective radius is $R_i$, 103. in all other topological cases, shown in the embodiments of FIGS. 2 through 4, the effective radius is equal to $R_i*D$, where D is the distance between the antennas, and $R_i$ is a constant factor, different for each topological case (i.e. for FIGS. 2 through 4, the index i=2, 3, and 4). In accordance with an embodiment of the invention, other methods for determining an effective radius may be used; including other methods that relate an increased distance between the antennas to an increased effective radius.

Next, after determining the effective radius of the cell-sector, the effective cell-area is determined by extending the cell sector beyond the edges of the sector, in certain cases. This determines the sidelines of the effective cell-area. The extension of the cell-area beyond the edges of the sector is required in two cases: 1) when one antenna is contained in the sector of the other cell, very near one of its limiting lines, as will be illustrated with reference to the embodiment of FIG. 5; and 2) when one antenna is outside the sector of the other cell, and the inner angle between the limiting line and the line connecting both antennas is greater than 180 degrees, as will be illustrated with reference to the embodiments of FIGS. 6A and 6B.

Figure 5:
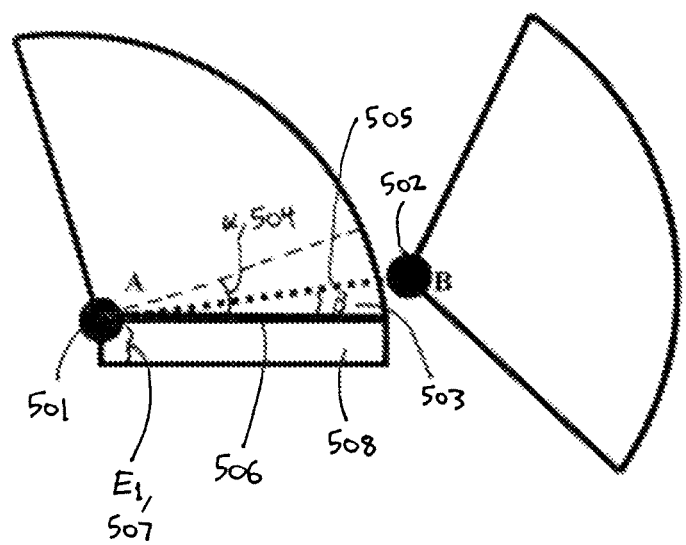
FIG. 5 shows an effective cell-area with extensions of a sector when one antenna is contained in the sector of another cell, near one of its limiting lines, in accordance with an embodiment of the invention.

In the first extension case, shown in the embodiment of FIG. 5, the angle β, 503 that is formed by the line 505 between the two antennas 501 and 502, and one of the limiting lines 506 of the first sector, is less than a pre-determined angle α 504. The predetermined angle α is pre-determined as the angle within which an antenna 502 is sufficiently close to the limiting line 506 to warrant an extension of the cell-area beyond the edges of the sector. When the angle β is less than α, the sector is extended only to one side, i.e. the side 506 that is near to the second antenna 502. A relatively small rectangular extension 508, which has a width dimension $E_1$, 507, is added to the side 506 of the sector.

Figure 6A:
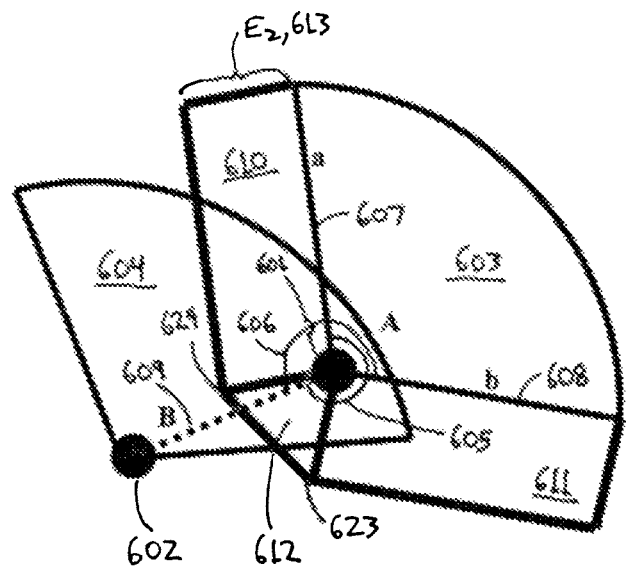
FIG. 6A shows an effective cell-area with extensions of a sector when a second antenna is outside the limits of the sector of a first antenna, and when an inner-angle criterion is satisfied for two edges of the sector, in accordance with an embodiment of the invention.

In the second extension case, described first with reference to the embodiment of FIG. 6A, a second antenna 602 is outside the limits of the sector 603 of a first antenna 601. In such a case, it is determined whether the inner angle, i.e. the angle that contains the first sector 603 itself, and that is formed between an edge 607 or 608 of the sector 603 and the line 609 between the two antennas 601 and 602, is greater than 180 degrees. If so, an extension is made to the sector edge 607 or 608 for which that condition is satisfied. For example, consider edge 607 of the sector 603. The inner angle between edge 607 and the line 609 is angle 605; and that angle 605 is greater than 180 degrees. Accordingly, edge 607 is extended by a rectangular extension 610. Similarly, considering edge 608 of the sector 603, the inner angle between edge 608 and the line 609 is angle 606; and that angle 606 is greater than 180 degrees. Accordingly, edge 608 is extended by a rectangular extension 611. In the second extension case of FIGS. 6A and 6B, the rectangular extensions, such as extensions 610 and 611, have a relatively larger width $E_2$, 613 than the width $E_1$, 507 of the rectangular extension of FIG. 5. Also, when there are two rectangular extensions to a given sector, as with extensions 610 and 611 on sector 603, an additional triangular extension 612 is made at the back of antenna 601 by connecting the two far corners 623 and 624 of the rectangular extensions; and the two extensions are of the same width $E_2$. It should be noted that, whereas large extensions are made to sector 603 because antenna 602 is outside the limits of the sector of antenna 601 (and the inner-angle criterion is satisfied), the reverse is not necessarily the case for the other sector. That is, in this case, sector 604 will not be extended by an extension of the second type, because antenna 601 is within sector 604.

Figure 6B:
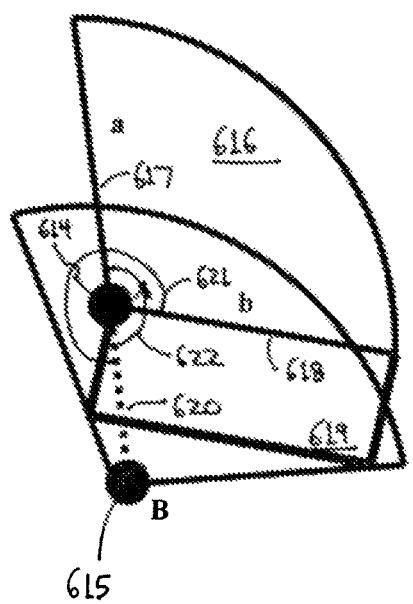
FIG. 6B shows an effective cell-area with extensions of a sector when a second antenna is outside the limits of the sector of a first antenna, and when an inner-angle criterion is satisfied for one edge of the sector, in accordance with an embodiment of the invention.

The embodiment of FIG. 6B shows another example of an extension of the second type, in which only one edge of a sector is extended with a large extension, instead of two. In particular, antenna 615 is outside the sector 616 of antenna 614. However, the inner angle 622 between sector edge 617 and the line 620 is exactly equal to 180 degrees (and therefore is not greater than 180 degrees), so that no extension is made to edge 617. By contrast, the inner angle 621 between sector edge 618 and the line 620 is greater than 180 degrees; therefore, an extension 619 of the second type is made to edge 618.

Figure 7:
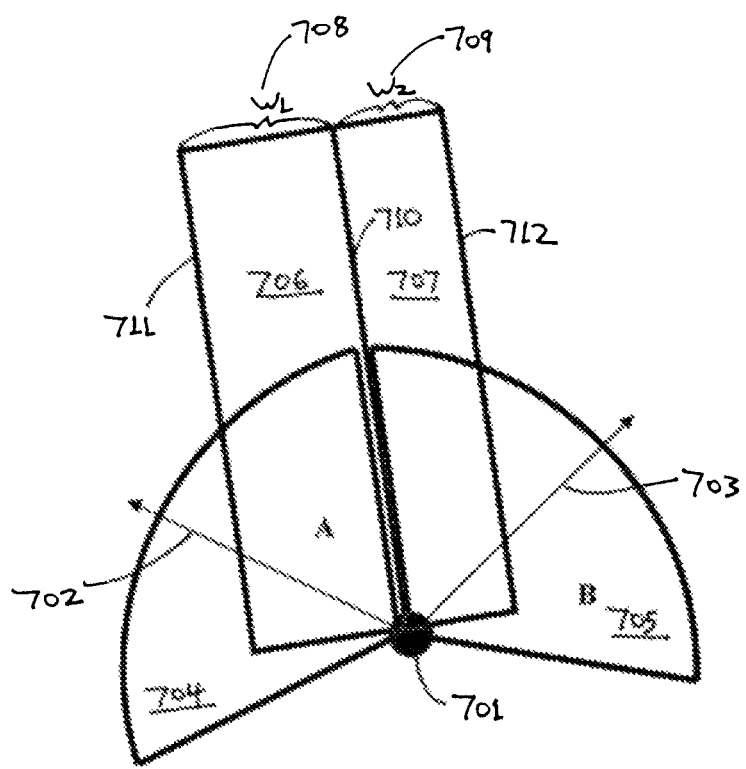
FIG. 7 illustrates the determination of a penumbra area around the line of equal intensity between two antennas, in the case in which two cells have antennas located at the same point, in accordance with an embodiment of the invention.
Figure 8:
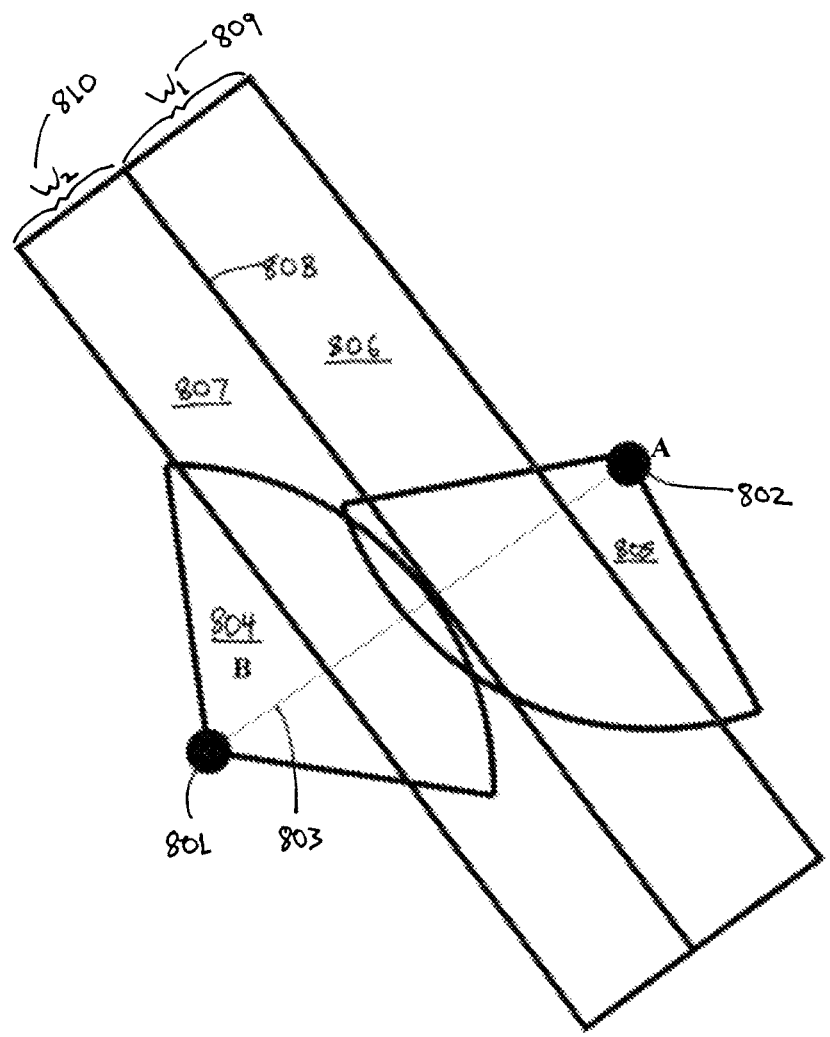
FIG. 8 illustrates the determination of a penumbra area around the line of equal intensity between two antennas, in the case in which two cells have antennas located at different points, and are oriented to face each other, in accordance with an embodiment of the invention.

Having determined the effective cell-area (by determining an effective radius and, in some cases, extending the edges of the sector), the second step of an embodiment according to the invention is to determine the penumbra area around the line of equal intensity between the two antennas, as illustrated with reference to the embodiments of FIGS. 7 and 8. The penumbra area around the line of equal intensity is modeled as an asymmetrical rectangular strip around the line of equal intensity. The width $W_1$ of the rectangular strip between the line of equal intensity and the strip limit on the side of the cell into which the cellular phone is moving, is longer than the width $W_2$ on the side of the cell out of which the cellular phone is moving. For example, with reference to the embodiment of FIG. 7, the penumbra area around the line of equal intensity 710 is formed by two rectangular strips 706 and 707, for which the width $W_1$, 708 of the strip 706 on the side of the sector 704 into which the cellular phone is moving, is longer than the width $W_2$, 709 of the strip 707 on the side of the sector 705 out of which the cellular phone is moving. Each strip is formed between the line of equal intensity 710 and a strip limit 711 and 712. Similarly, with reference to the embodiment of FIG. 8, the penumbra area around the line of equal intensity 808 is formed by two rectangular strips 806 and 807, for which the width $W_1$, 809 of the strip 806 on the side of the sector 805 into which the cellular phone is moving, is longer than the width $W_2$, 810 on the side of the sector 804 out of which the cellular phone is moving.

In determining the penumbra area around the equal intensity line, according to an embodiment of the invention, it is first necessary to determine the location of the equal intensity line, which varies depending on the topological case. In the first topological case of the embodiment of FIG. 1, which is also the case in FIG. 7, the equal intensity line is the bisector 710 of the cells' azimuths 702 and 703 (which emanate from the location 701 of the antennas). In the second and third topological cases of the embodiments of FIGS. 2 and 3, the equal intensity line is approximately the central perpendicular to the line connecting the two antennas. For example, in FIG. 8, which corresponds to the topological case of FIG. 2, the equal intensity line is the central perpendicular 808 to the line 803 connecting the two antennas 801 and 802. In the fourth topological case of the embodiment of FIG. 4, the equal intensity points are difficult to define, and a strip similar to those of FIGS. 7 and 8 does not exist.

Figure 9:
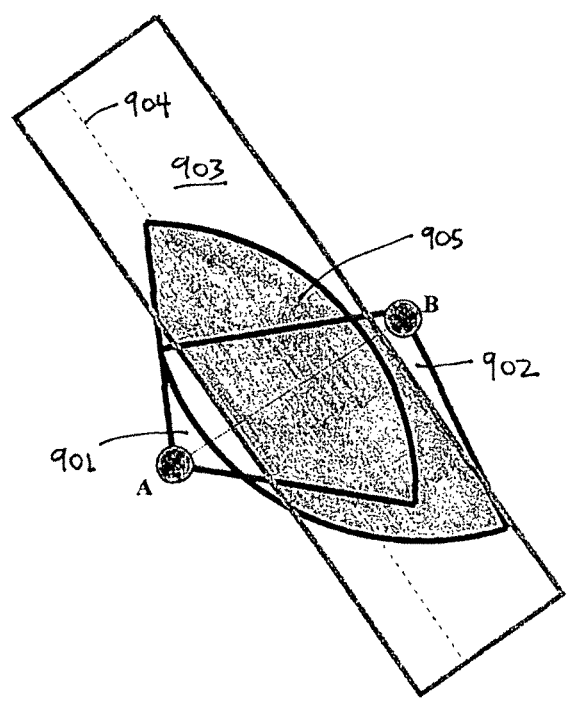
FIG. 9 illustrates the determination of a handover area for the case in which two cells have antennas located at different points, and are oriented to face each other, in accordance with an embodiment of the invention.

Having determined the effective cell-area and the penumbra area around the line of equal intensity, a third step of an embodiment according to the invention is to determine the handover area. For each of the topological cases except that of the embodiment of FIG. 4, the area in which each cell is potentially able to perform a handover is formed, for each cell, by the intersection of its effective cell-area and the penumbra area around the line of equal intensity. The cell A to cell B handover area is then found as the union of the areas in which the two cells are potentially able to perform a handover. For example, with reference to the embodiment of FIG. 9, the handover area for a cellular phone traveling from cell A, 901 to cell B, 902 is determined by first intersecting the effective area of cell A with the rectangular strip 903 of the penumbra area around the equal intensity line 904; then intersecting the effective area of cell B with the rectangular strip 903; and then forming union of these two areas, which is represented as the shaded area 905. The embodiment of FIG. 9 illustrates the determination of the cell A to cell B handover area for the topological case of the embodiment of FIG. 2, in which the rectangular strip 903 is well defined. In the topological case of the embodiment of FIG. 4, for which a similar rectangular strip is not defined, the cell A to cell B handover area is found as the intersection of the two effective cell-areas, each of which may include extensions of either the first or second type described above. For example, in the embodiment of FIG. 10, the effective cell-area of sector 1001 has been extended by an extension 1002 of the first type, and the effective cell-area of sector 1003 has been extended by extensions 1004, 1005, and 1006 of the second type. Because this is a topological case similar to that of the embodiment of FIG. 4, the handover area from cell 1001 to cell 1003 is equal to the intersection between their two effective cell-areas, which is shown as shaded area 1007. It should be noted that the only difference between a cell A to cell B handover area, and a cell B to cell A handover area, derives from the asymmetry of the penumbra area around the equal intensity line, which occurs in the topological cases of the embodiments of FIGS. 1 through 3.

Figure 10:
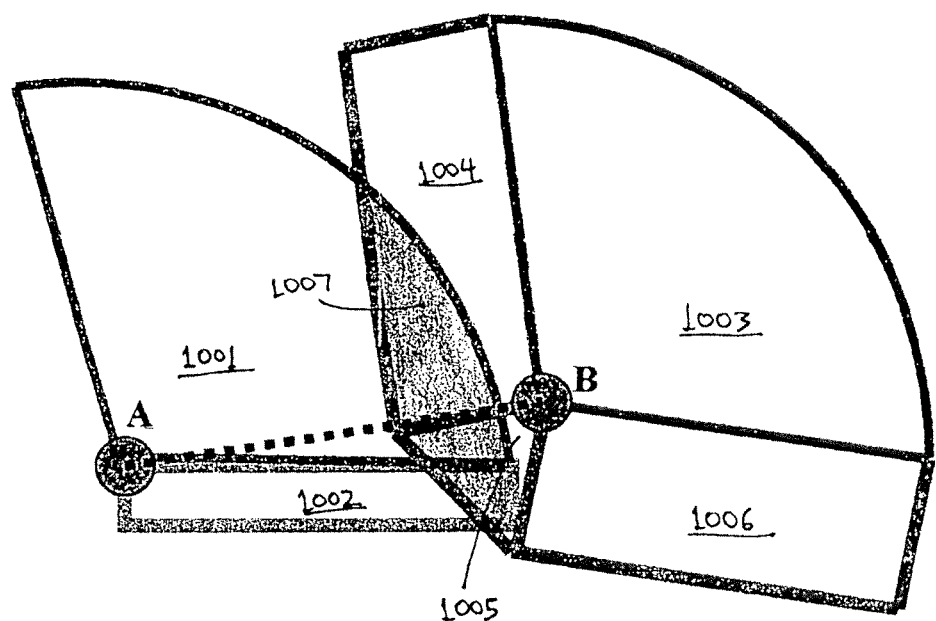
FIG. 10 illustrates the determination of a handover area for the case in which a line of equal intensity is not well-defined, in accordance with an embodiment of the invention.

As can be seen from the embodiment of FIG. 10, the handover area 1007 determined in accordance with an embodiment of the invention herein, is much smaller than the effective areas of the cell sectors 1001 and 1003. Thus, on average, a method according to an embodiment of the invention, which determines the handover area, is more accurate in locating a cellular phone than prior art techniques that rely on locating only the cell sector.

Figure 11:
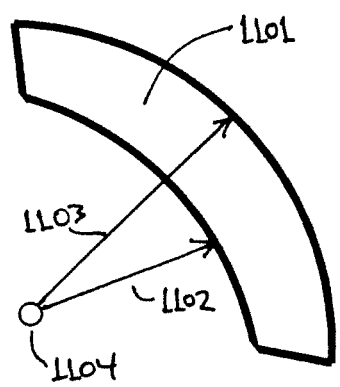
FIG. 11 shows a ring-sector, which is used to model the estimated location of a cellular phone when a cellular network uses time advance data, in accordance with an embodiment of the invention.

An embodiment according to the invention also improves accuracy, on average, when the cellular network specifies the location of a cellular phone using time advance data, in addition to cell identifier data. FIG. 11 shows a ring-sector 1101, which is used to model the estimated location of a cellular phone in such a case, in accordance with an embodiment of the invention. The additional time advance data restricts the location of the handset to a ring sector 1101 between two given radii 1102 and 1103 from an antenna 1104. It will be appreciated that use of time-advance data, or other possible data specified by a cellular network, which may narrow the modeled cell area, can be used consistently with embodiments herein—for example by modifying the model for determining effective cell area. Thus, for example, in the embodiment of FIG. 11, the cell area may be modeled as a ring sector, which is possibly extended to create an effective cell area in a similar fashion to the techniques described herein. Other shapes for cell areas may also be used in accordance with an embodiment of the invention. Regardless of the shape of the effective cell area, techniques in accordance with an embodiment of the invention, on average, improve the accuracy of locating a cellular phone. Using the ring sector of FIG. 11, for example, a similar rate of reduction in area may be obtained as when full sectors are used as above.

Those of skill in the art will appreciate that the generalized parameters mentioned above (such as parameters $R_1, R_2, R_3, R_4, \alpha, E_1, E_2, W_1,$ and $W_2$), may be determined empirically and calibrated by field trials. For example, tests may be performed in which actual locations of test cellular phones are known, so that the actual locations can be empirically matched against the cell map to determine proper values for the parameters. The parameters may be estimated statistically based on the empirical results, and may be improved as test results and other data are accumulated over time.

Figure 12:
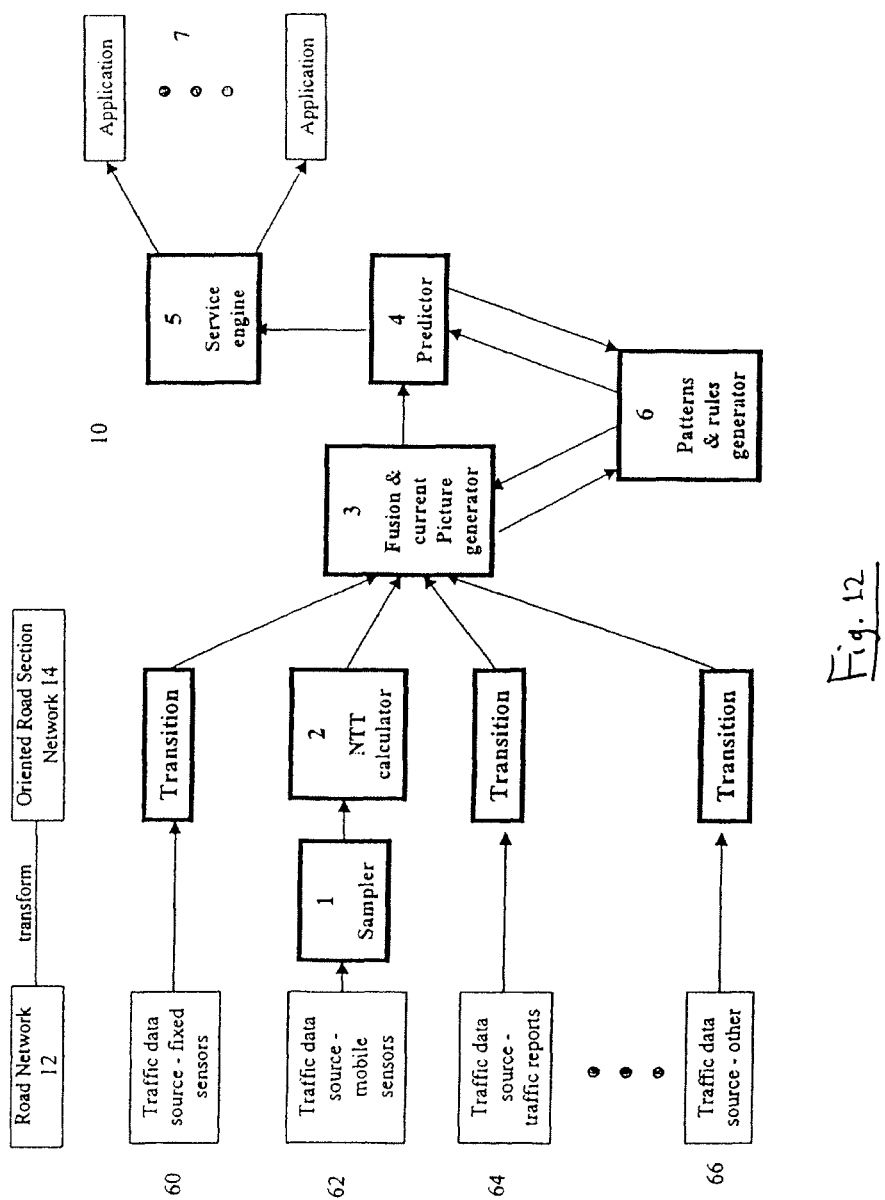
FIG. 12 is a block diagram of a traffic information system, as part of which an embodiment according to the invention may be used.

In accordance with an embodiment of the invention, a system and method for location of cellular phones may be used as part of a traffic information system, such as that described in U.S. Pat. No. 6,587,781 of Feldman et al., a summary block diagram of which is shown in the embodiment of FIG. 12. In this system, there is determined the location of each of a plurality of mobile sensors in vehicles traveling on a road network 12, which has been analyzed to form an oriented road section network 14. Position data 62 is collected over time from the mobile sensors, and sampled periodically by a sampler 1 for passage to a normalized travel time calculator 2. Based on the sampled data, the travel time calculator 2 determines a mean normalized travel time value for each oriented road section of the network 14. A fusion and current picture generator 3 then uses the calculated normalized travel times, as well as data obtained from other sensors, to generate a current picture of traffic conditions on the road network. A predictor 4 can then use the current picture, as well as rules from a patterns and rules generator 6, to predict traffic conditions or provide other information to a service engine 5, which may serve a variety of applications 7. The fusion and current picture generator 3 may fuse data from a variety of sources, including the normalized travel time calculator 2, traffic data from fixed sensors 60, traffic data from traffic reports 64, and traffic data from other sources 66.

In accordance with an embodiment of the invention, an apparatus for implementing the technique of locating cellular phones, described herein, can be used to generate traffic data using cellular phone locations from phones in vehicles. For example, when a handover area is determined for given cellular phone, a traffic system can use the geographical area corresponding to the handover area that has been determined, as an estimate of the location of a vehicle in which that cellular phone was located at the time that handover event occurred. Based on the resulting position and time data for a large number of such vehicles, and traffic data from other sources, a normalized travel time calculator 2, or other traffic system component, can generate a picture of traffic conditions for a variety of uses, including for predicting upcoming traffic conditions. In one embodiment, a technique in accordance with those described herein for geographically locating a cellular phone is implemented by the sampler module 1 of the embodiment of FIG. 12. The sampler module 1 is fed position data 62, which may include streaming data relating to cellular handover events, from a cellular network. The position data 62 may include, for example, cell identifier and time advance data from a cellular carrier; as well as vehicle position data from a variety of other mobile sensor sources, such as GPS data or other Floating Vehicle Data. Vehicle position data 62 from each different type of mobile sensor source is sampled by its own adjusted sampler sub-module (included in sampler module 1 of FIG. 12). Multiple sampler sub-modules may also be used for processing different types of data from the same mobile sensor source. For example, separate sampler sub-modules may be used for processing cellular handover data and cellular location server data.

Figure 13:
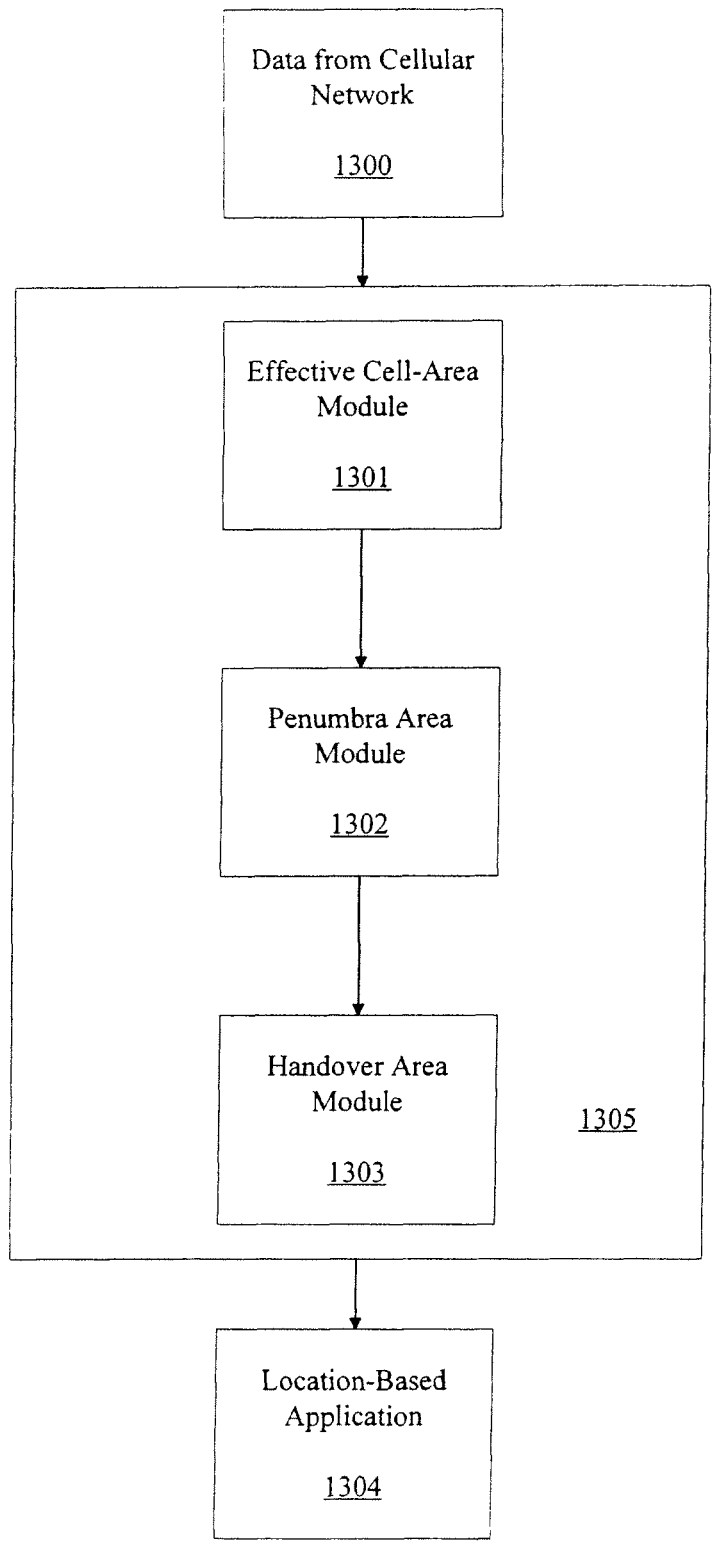
FIG. 13 is a block diagram of an apparatus for locating cellular phones, in accordance with an embodiment of the invention.

FIG. 13 is a block diagram of an apparatus for locating cellular phones, in accordance with 10 an embodiment of the invention. This may be used, for example, in the traffic information system of the embodiment of FIG. 12. As summarized in the block diagram of the embodiment of FIG. 13, such an apparatus 1305 for locating cellular phones may include an effective cell-area module 1301 for determining cell-areas; a penumbra area module 1302 for determining the penumbra area around the line of equal intensity; and a handover area module 1303 for 15 determining the handover area. The apparatus 1305 for locating cellular phones may be implemented in a variety of different forms of hardware, as will be apparent to those of skill in the art upon reading the techniques disclosed herein. For example, the apparatus 1305 may comprise a computer processor or specialized signal processing circuit, which receives data 1300 on cellular handover events, or other cellular data, generated by a cellular network; and which transmits a resulting calculated handover area to a location-based application 1304; for example, the traffic information system of the embodiment of FIG. 12. Various method steps described in embodiments herein may be implemented as routines in computer program code running on a computer processor 1305, or as equivalent specialized circuits for data processing.

Also, an apparatus according to an embodiment of the invention need not be implemented in the form of the embodiment of FIG. 13. For example, two possible ways of implementing techniques herein are as follows (these examples are not intended to be limiting). In a first example, a cell-map of a cellular carrier may be available to a system according to the invention. In this case, handover areas for all possible combinations of neighboring cells can be determined, based on the cellular map, in an off-line process, and stored in a database accessible by a system according to the invention. When cellular data streams into the system, the system uses the cell identifiers and/or time advance data; or other cellular network data for a given handover event to consult the database (for example, using a lookup table) and thereby obtain the relevant handover area. Thus, in the first example, the functions of apparatus 1305 are performed off-line, and data 1300 is subsequently processed online with reference to the handover data created offline by module 1303. By contrast, in a second example, a cell-map is not available to a system according to the invention. Instead, the system receives the geographical parameters of the cells involved in each handover event, and calculates the handover areas online based on the data stream, using, for example, the embodiment of FIG. 13. The modules 1301-1303 of the embodiment of FIG. 13 need not be mapped directly onto different software modules; instead, the software may have a different or more complex architecture implementing equivalent functionality, as will be appreciated by those of skill in the art.

A skilled reader will appreciate that, while the foregoing has described what is considered to be the best mode and where appropriate other modes of performing the invention, the invention should not be limited to specific apparatus configurations or method steps disclosed in this description of the preferred embodiment. For example, while various embodiments herein refer to geographically locating a "cellular phone," it will be appreciated that this term should be construed broadly to refer not only to mobile cellular handsets, but also, for example, to other modules in communication with a cellular network, such as vehicle-bound probes which communicate with a cellular network. Those skilled in the art will also recognize that the invention has a broad range of applications. For example, embodiments according to the invention for geographically locating a cellular phone may be used in a wide variety of applications; including (but not limited to): location-based services, generally; traffic information systems; for emergency purposes, such as in locating a cellular phone that was used to call an emergency number; for escape planning; and for security, intelligence, and national defense applications. It will also be appreciated that the embodiments admit of a wide range of modifications without departing from the inventive concepts.

What is claimed is:

1. A method of geographically locating a cellular phone, the method comprising:
   determining that a handover of the cellular phone from a first cell to a second cell has occurred;
   determining a geographical area in which the handover from the first cell to the second cell occurred by:
   modeling at least a portion of a cell reception area of the first cell and the second cell;
   defining a handover area comprising overlapping portions of the first and second cell areas; and
   concluding that when the handover occurred the cellular phone was located in the handover area;
   wherein modeling the at least a portion of the cell reception area of the first cell and the second cell comprises using a pre-defined shape as an initial model of at least a portion of the cell reception area of at least one of the first cell and the second cell.

2. The method according to claim 1, further comprising:
   determining whether to extend the cell reception area based on predetermined criteria.

3. The method according to claim 2, wherein the predetermined criteria comprise criteria based on a relative orientation of the first cell and the second cell.

4. The method according to claim 2, wherein the predetermined criteria comprise criteria based on relative positions of the first cell and the second cell.

5. The method according to claim 1, wherein the pre-defined shape comprises a sector.

6. The method according to claim 1, wherein the pre-defined shape comprises a ring-sector.

7. The method according to claim 1, wherein defining the handover area comprises forming a polygon representing the handover area.

8. The method according to claim 1, wherein defining the handover area comprises forming a penumbra area shape around a line of equal intensity of reception between the first cell and the second cell.

9. The method according to claim 8, wherein the penumbra area shape comprises a polygon.

10. The method according to claim 9, wherein the penumbra area shape comprises a rectangle.

11. An apparatus for geographically locating a cellular phone, the apparatus comprising:
    means for determining that a handover of the cellular phone from a first cell to a second cell has occurred;
    means for determining a geographical area in which the handover from the first cell to the second cell occurred, wherein the means for determining the area comprises:
    an effective cell-area module for modeling at least a portion of a cell reception area of the first cell and the second cell;
    a handover area module for defining a handover area comprising overlapping portions of the first and second cell areas; and
    means for concluding that when that the handover occurred the cellular phone was located in the handover area;
    wherein the effective cell-area module comprises means for modeling the at least a portion of the cell reception area of the first cell and the second cell using a pre-defined shape as an initial model of at least a portion of the cell reception area of at least one of the first cell and the second cell.

12. The apparatus according to claim 11, wherein the effective cell-area module comprises means for determining whether to extend the cell reception area based on predetermined criteria.

13. The apparatus according to claim 12, wherein the predetermined criteria comprise criteria based on a relative orientation of the first cell and the second cell.

14. The apparatus according to claim 12, wherein the predetermined criteria comprise criteria based on relative positions of the first cell and the second cell.

15. The apparatus according to claim 11, wherein the pre-defined shape comprises a sector.

16. The apparatus according to claim 11, wherein the pre-defined shape comprises a ring-sector.

17. The apparatus according to claim 11, wherein the handover area module comprises means for forming a polygon representing the handover area.

18. The apparatus according to claim 11, wherein the handover area module comprises means for forming a penumbra area shape around a line of equal intensity of reception between the first cell and the second cell.

19. The apparatus according to claim 18, wherein the penumbra area shape comprises a polygon.

20. The apparatus according to claim 19, wherein the penumbra area shape comprises a rectangle.

* * * * *